US009903247B2

United States Patent
Koshy et al.

(10) Patent No.: US 9,903,247 B2
(45) Date of Patent: Feb. 27, 2018

(54) REDUCTANT APPORTIONMENT FOR MULTI-DOSING ARCHITECTURES

(71) Applicant: Cummins Emission Solutions Inc., Columbus, IN (US)

(72) Inventors: Royce V. Koshy, Greenwood, IN (US); Shireen Faizi, Columbus, IN (US); Jeremy D. Harris, Franklin, IN (US); Aditya Hegde, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 14/985,736

(22) Filed: Dec. 31, 2015

(65) Prior Publication Data
US 2017/0191393 A1 Jul. 6, 2017

(51) Int. Cl.
*F01N 3/00* (2006.01)
*F01N 3/20* (2006.01)

(52) U.S. Cl.
CPC ...... *F01N 3/208* (2013.01); *F01N 2610/1453* (2013.01); *F01N 2900/0412* (2013.01); *F01N 2900/08* (2013.01); *F01N 2900/1404* (2013.01); *F01N 2900/1411* (2013.01)

(58) Field of Classification Search
CPC ............ F01N 3/208; F01N 2610/1453; F01N 2900/0412; F01N 2900/08; F01N 2900/1404; F01N 2900/1411
See application file for complete search history.

(56) References Cited

U.S. PATENT DOCUMENTS

| 8,109,077 B2* | 2/2012 | Reba ............... F01N 3/0253 60/274 |
| 9,222,388 B2* | 12/2015 | Kregling ............... F01N 3/2066 |
| 9,512,763 B2* | 12/2016 | Hudgens ............... F01N 3/2066 |
| 2004/0118109 A1 | 6/2004 | Gladden |
| 2008/0066453 A1 | 3/2008 | Oberski et al. |

(Continued)

FOREIGN PATENT DOCUMENTS

WO  WO-2015/041830  3/2015

OTHER PUBLICATIONS

International Search Report and Written Opinion issued for PCT/US2016/067178, dated Apr. 24, 2017, 13 pages.

*Primary Examiner* — Jesse Bogue
(74) *Attorney, Agent, or Firm* — Foley & Lardner LLP

(57) ABSTRACT

A system for apportioning reductant dosing amounts in multi-doser architectures includes an engine, an aftertreatment system in fluid communication with the engine, and a controller. The aftertreatment system includes a first doser configured to dose reductant into a first decomposition reaction member and a second doser configured to dose reductant into a second decomposition reaction member. The controller receives engine operating conditions and determines a total reductant amount based on the engine operating conditions. The controller also apportions the total reductant amount into a first apportioned reductant amount based on a first maximum reductant dosing amount for the first doser and a second apportioned reductant amount based on a second maximum reductant dosing amount for the second doser. The controller outputs a first apportioned reductant dosing command to the first doser and a second apportioned reductant dosing command to the second doser.

26 Claims, 6 Drawing Sheets

(56) References Cited

U.S. PATENT DOCUMENTS

| | | |
|---|---|---|
| 2008/0087008 A1 | 4/2008 | Reba et al. |
| 2011/0023466 A1 | 2/2011 | Branco et al. |
| 2012/0017568 A1 | 1/2012 | Geveci et al. |
| 2012/0204542 A1 | 8/2012 | Norris et al. |
| 2013/0104530 A1* | 5/2013 | Geveci ................ G01N 27/407 60/301 |
| 2013/0186067 A1* | 7/2013 | Dahl ........................ F01N 3/208 60/274 |
| 2013/0232958 A1* | 9/2013 | Ancimer ................ F01N 3/208 60/301 |
| 2013/0305695 A1* | 11/2013 | Henry .................... F01N 3/103 60/286 |
| 2014/0116027 A1* | 5/2014 | Ancimer ............... F01N 3/2053 60/274 |
| 2015/0075143 A1 | 3/2015 | Gong et al. |
| 2015/0196878 A1* | 7/2015 | Nunez .................... F01N 3/208 423/212 |
| 2015/0204226 A1 | 7/2015 | Moore |
| 2015/0275730 A1* | 10/2015 | Gupta .................... F01N 3/208 60/274 |
| 2016/0010529 A1* | 1/2016 | Wang ........................ F17D 3/00 60/274 |
| 2016/0090887 A1 | 3/2016 | Mitchell et al. |

\* cited by examiner

REDUCTANT APPORTIONMENT FOR MULTI-DOSING ARCHITECTURES

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst reaction tube of an exhaust system, such as that of a vehicle or power generation unit. A reductant such as anhydrous ammonia, aqueous ammonia, or urea is typically introduced into the exhaust gas flow prior to the catalyst reaction tube. To introduce the reductant into the exhaust gas flow for the SCR process, an SCR system may dose or otherwise introduce the reductant through a doser that vaporizes or sprays the reductant into an exhaust pipe of the exhaust system up-stream of the catalyst reaction tube. The SCR system may include one or more sensors to monitor conditions within the exhaust system.

SUMMARY

Implementations described herein relate to apportioning reductant dosing amounts for multiple dosers based on maximum reductant dosing amounts to reduce the likelihood of reductant impingement and deposit formation.

One implementation relates to a system that includes an engine, an aftertreatment system in fluid communication with the engine, and a controller. The aftertreatment system includes a first decomposition reaction member, a first doser, a second decomposition reaction member, and a second doser. The first doser is configured to dose reductant into the first decomposition reaction member, and the second doser is configured to dose reductant into the second decomposition reaction member. The controller is configured to receive engine operating conditions for the engine and determine a total reductant amount based on the engine operating conditions. The controller is further configured to apportion the total reductant amount into a first apportioned reductant amount based on a first maximum reductant dosing amount for the first doser and a second apportioned reductant amount based on a second maximum reductant dosing amount for the second doser. The controller is also configured to output a first apportioned reductant dosing command to the first doser based on the first apportioned reductant amount and a second apportioned reductant dosing command to the second doser based on the second apportioned reductant amount.

In some implementations, the first maximum reductant dosing amount and the second maximum reductant dosing amount are based on a temperature of an exhaust gas and/or an exhaust gas flow rate. In some implementations, apportioning the total reductant amount into a first apportioned reductant and a second apportioned reductant amount includes calculating an excess amount of reductant for the second doser based on the second maximum reductant dosing amount and calculating a cross-compensation amount for the first doser based on the calculated excess amount. The apportioning of the total reductant amount into a first apportioned reductant and a second apportioned reductant amount may further include dividing the total reductant into a first initial dosing amount for the first doser and a second initial dosing amount for the second doser, and the cross-compensation amount for the first doser is based on the calculated excess amount and the first initial dosing amount. In some implementations, the first maximum reductant dosing amount and the second maximum reductant dosing amount and/or the total reductant amount are based on a look-up table.

Another implementation relates to a method for apportioning reductant dosing amounts for multiple-dosing architectures. The method includes receiving engine operating conditions for an engine and determining a total reductant amount based on the engine operating conditions. The method also includes apportioning the total reductant amount into a first apportioned reductant amount based on a first maximum reductant dosing amount for a first doser and a second apportioned reductant amount based on a second maximum reductant dosing amount for a second doser. The first doser is configured to dose reductant into a first decomposition reaction member, and the second doser is configured to dose reductant into a second decomposition reaction member. The method further includes outputting a first apportioned reductant dosing command to the first doser based on the first apportioned reductant amount and a second apportioned reductant dosing command to the second doser based on the second apportioned reductant amount.

In some implementations, the first maximum reductant dosing amount and the second maximum reductant dosing amount are based on a temperature of an exhaust gas and/or an exhaust gas flow rate. In some implementations, apportioning the total reductant amount into a first apportioned reductant and a second apportioned reductant amount includes calculating an excess amount of reductant for the second doser based on the second maximum reductant dosing amount and calculating a cross-compensation amount for the first doser based on the calculated excess amount. The apportioning of the total reductant amount into a first apportioned reductant and a second apportioned reductant amount may further include dividing the total reductant into a first initial dosing amount for the first doser and a second initial dosing amount for the second doser, and the cross-compensation amount for the first doser is based on the calculated excess amount and the first initial dosing amount. In some implementations, the first maximum reductant dosing amount and the second maximum reductant dosing amount and/or the total reductant amount are based on a look-up table.

Yet a further implementation relates to an apparatus that includes a controller. The controller includes a dosing command circuit and an apportionment circuit. The dosing command circuit is configured to determine a total reductant amount based on engine operating conditions of an engine. The apportionment circuit is configured to apportion the total reductant amount into a first apportioned reductant amount based on a first maximum reductant dosing amount for the first doser and a second apportioned reductant amount based on a second maximum reductant dosing amount for the second doser. The first doser is configured to dose reductant into a first decomposition reaction member, and the second doser is configured to dose reductant into a second decomposition reaction member. The apportionment circuit is further configured to output a first apportioned reductant dosing command to a first doser based on the first apportioned reductant amount and a second apportioned reductant dosing command to the second doser based on the second apportioned reductant amount.

In some implementations, the first maximum reductant dosing amount and the second maximum reductant dosing amount are based on a temperature of an exhaust gas and an exhaust gas flow rate. In some implementations, the controller further includes a dosing amount data structure storing the first maximum reductant dosing amount and the second maximum reductant dosing amount. In some implementations, apportioning the total reductant amount into a first apportioned reductant and a second apportioned reductant amount includes calculating an excess amount of reductant for the second doser based on the second maximum reductant dosing amount and calculating a cross-compensation amount for the first doser based on the calculated excess amount. The apportioning of the total reductant amount into a first apportioned reductant and a second apportioned reductant amount may further include dividing the total reductant into a first initial dosing amount for the first doser and a second initial dosing amount for the second doser, and the cross-compensation amount for the first doser is based on the calculated excess amount and the first initial dosing amount. In some implementations, the first maximum reductant dosing amount and the second maximum reductant dosing amount and/or the total reductant amount are based on a look-up table.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
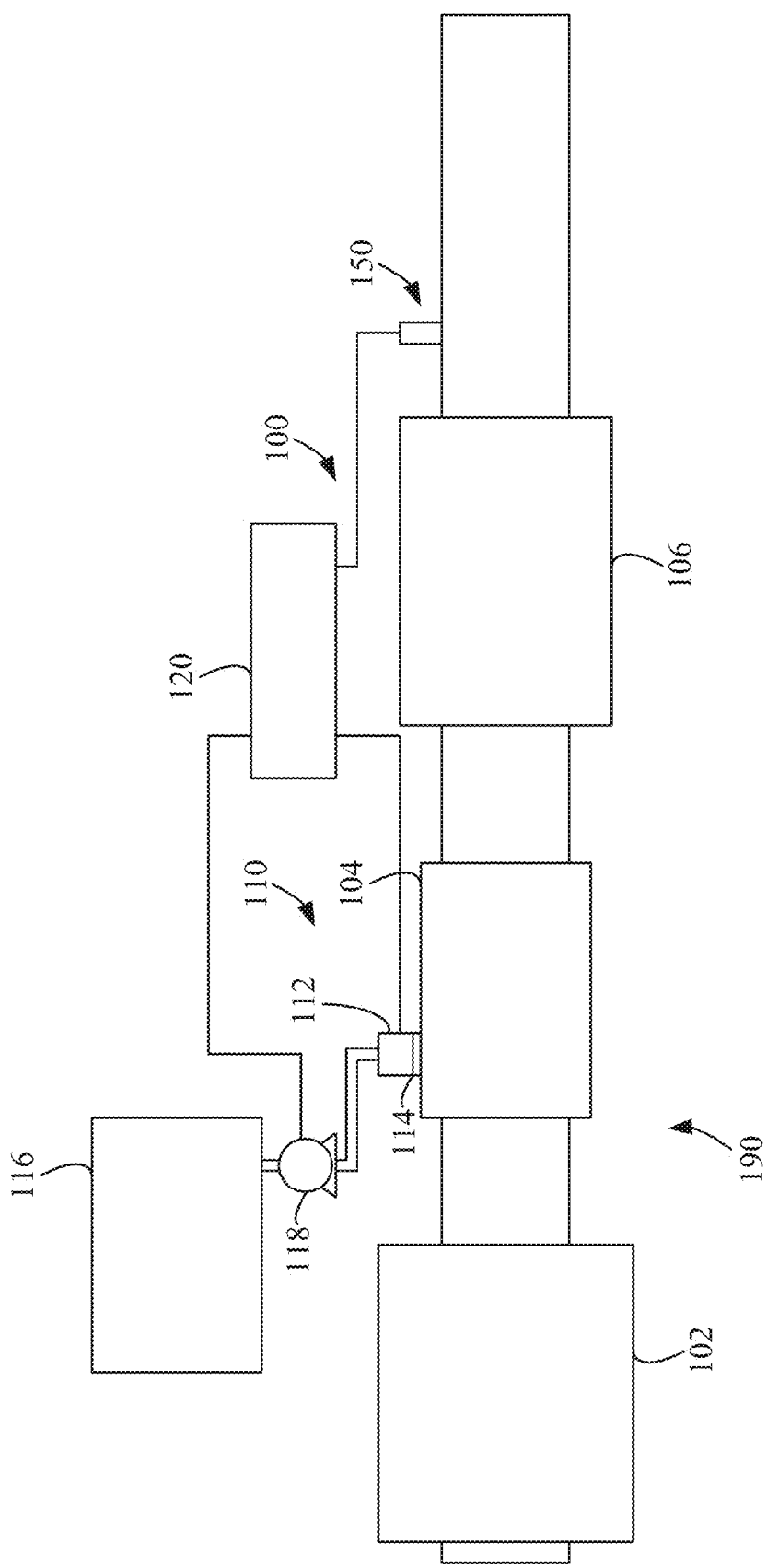
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for apportioning a commanded dosing amount between one or more dosers. The various concepts introduced above and discussed in greater detail below may be implemented in any of numerous ways, as the described concepts are not limited to any particular manner of implementation. Examples of specific implementations and applications are provided primarily for illustrative purposes.

I. Overview

A selective catalytic reduction process uses diesel exhaust fluid or reductant to reduce $NO_x$ emissions. In this process, vaporized reductant and hot exhaust gases enter a catalytic converter located in an exhaust system. Under certain exhaust conditions, urea will decompose into gaseous ammonia, but some of urea may not completely decompose, which can result in solid by-products, such as urea deposits formed within the exhaust system. In certain implementations, the decomposition reaction tube has a sufficient effective length to substantially reduce the likelihood of urea deposit formation. However, depending on the decomposition reaction tube design, certain dosed reductant may impinge upon walls of the decomposition reaction tube, thereby creating localized cooling which can increase deposit formation.

In some instances, such as for large volume exhaust systems and/or for size reduction purposes, multiple dosers may be utilized to dose reductant into the exhaust system. For such multiple dosers, a commanded dosing amount may be equally divided between the multiple dosers. That is, if a commanded dosing amount is 20 mL/s for the selective catalytic reduction system, then a system with two dosers may command each doser to dose 10 mL/s to meet the total commanded dosing amount. However, depending upon the design of the decomposition reaction tube and/or the positioning of the dosers in the exhaust system, commanding each doser to dose an equal amount of reductant may result in reductant for one doser impinging on a wall of the decomposition reaction tube, thereby forming reductant deposits. For instance, a primary doser may be positioned to dose into a primary decomposition reaction tube, and a secondary doser may be positioned to dose into a secondary decomposition reaction tube that is smaller than the primary decomposition reaction tube. Thus, if the commanded dosing amount is evenly divided between the primary and secondary dosers, then the secondary doser may dose extra reductant that impinges on a wall of the secondary decomposition reaction tube, thereby forming reductant deposits.

Thus, in some implementations, a controller for a selective catalytic reduction system may include logic to apportion amounts of a commanded dosing amount to each doser of the system based on corresponding limits for each doser to reduce reductant deposit formation. In some instances, a maximum reductant dosing amount for each doser of a system may be included in a look-up table. In some implementations, several maximum reductant dosing amounts for each doser may be included in the look-up table based on an exhaust temperature and/or exhaust flow (either measured or estimated). The controller then may apportion the commanded dosing amount for the dosers based on the maximum reductant dosing amounts for each doser. Thus, if one doser, such as a secondary doser, has a lower maximum dosing amount, then the commanded dosing amount can be reallocated to the primary doser that has a higher maximum dosing amount. Accordingly, the system can reduce the likelihood of reductant deposit formation by dynamically allocating amounts of a commanded dosing amount to multiple dosers based on maximum dosing amounts for each doser.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition reaction tube or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition reaction tube 104 is configured to convert a reductant, such as urea, aqueous ammonia, or diesel exhaust fluid (DEF), into ammonia. It should be noted that, while element 104 is referred to as a decomposition reaction tube herein, the structure used to convert the reductant can take the form of another type of decomposition reaction member or structure as well, such as a chamber. The term "decomposition reaction tube" should therefore be interpreted broadly herein. The decomposition reaction tube 104 includes a reductant delivery system 110 having a doser 112 configured to dose the reductant into the decomposition reaction tube 104. In some implementations, the reductant is injected or otherwise inserted upstream of the SCR catalyst 106. The reductant droplets then undergo the processes of evaporation, thermolysis, and hydrolysis to form gaseous ammonia within the exhaust system 190. The decomposition reaction tube 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition reaction tube 104 includes the doser 112 mounted to the decomposition reaction tube 104 such that the doser 112 may dose the reductant into the exhaust gases flowing in the exhaust system 190. The doser 112 may include an insulator 114 interposed between a portion of the doser 112 and the portion of the decomposition reaction tube 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition reaction tube 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition reaction tube 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition reaction tube or reactor pipe 104. For instance, the DPF 102 and the SCR catalyst 106 may be combined into a single unit, such as a SCR on diesel particulate filter (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit For example, a sample pipe may extend from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition reaction tube 104, within the decomposition reaction tube 104, between the decomposition reaction tube 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

Figure 2:
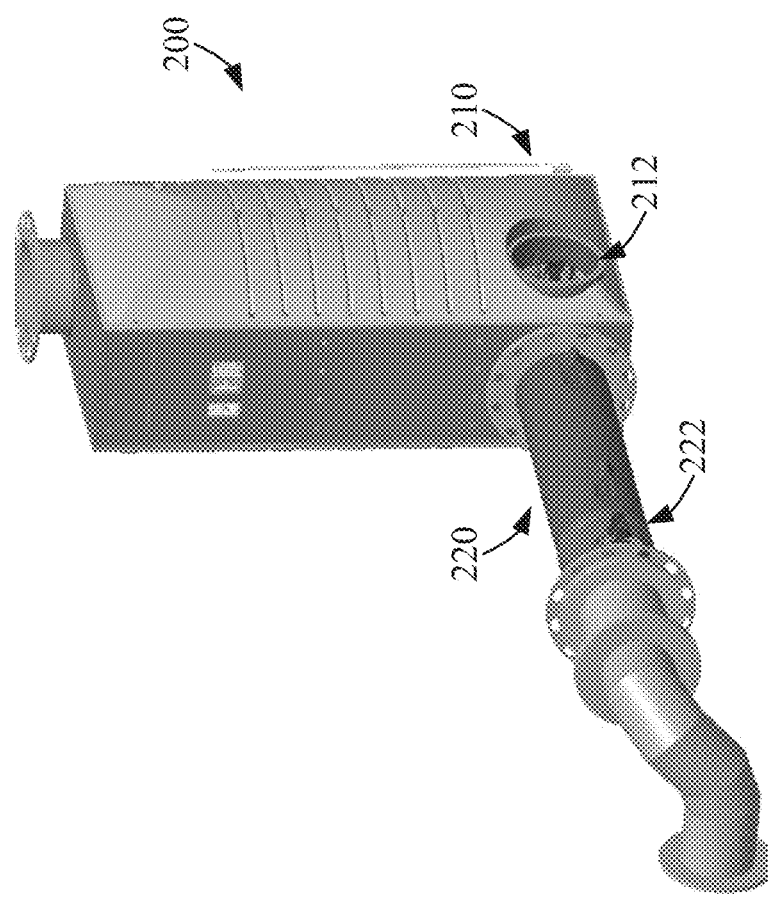
FIG. 2 is perspective view of a primary decomposition reaction tube and a secondary decomposition reaction tube of a selective catalytic reduction system for dosing and decomposing reductant.

FIG. 2 depicts a decomposition reaction portion 200 of an exhaust system, such as exhaust system 190 of FIG. 1. The decomposition reaction portion 200 includes a primary decomposition reaction tube 210 and a secondary decomposition reaction tube 220. The primary decomposition reaction tube 210 and secondary decomposition reaction tube 220 may be implemented in an exhaust system that has a large exhaust volume (e.g., for an exhaust system in a locomotive, mining equipment, etc.) and/or in a compact exhaust system where a single decomposition reaction tube may be too large. In some implementations, more than two decomposition reaction tubes may be used (e.g., 3, 4, or 5 decomposition reaction tubes).

The primary decomposition reaction tube 210 includes a primary doser 212 and the secondary decomposition reaction tube 220 includes a secondary doser 222. In some implementations, the primary decomposition reaction tube 210 and secondary decomposition reaction tube 220 have differing designs, which may result in differing reductant deposit formation for the primary doser 212 and secondary doser 222. For instance, as shown in FIG. 2, the primary decomposition reaction tube 210 may be a larger decomposition reaction tube than the secondary decomposition reaction tube 220. Thus, the primary doser 212 can dose more reductant into the primary decomposition reaction tube 210 before reductant deposits form while the secondary doser 222 may form reductant deposits in the secondary decomposition reaction tube 220 if the same amount of reductant is dosed. Accordingly, independent reductant dosing impingement control (i.e., separate impingement limit tables) for each doser 212, 222 may be used to mitigate deposit formation. In some implementations, the primary decomposition reaction tube 210 and/or secondary decomposition reaction tube 220 and/or the dosers 212, 222 may be selectively used based on engine operating conditions.

Figure 3:
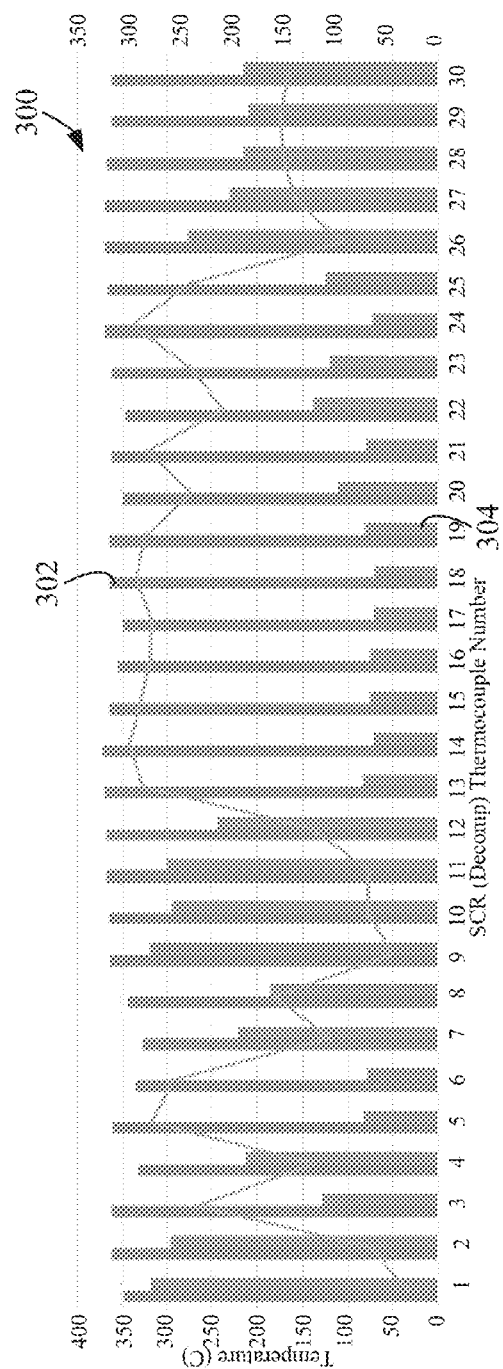
FIG. 3 is a diagram of graphical distributions of temperature versus a wall position during operation with no dosing and during dosing.
Figure 3:
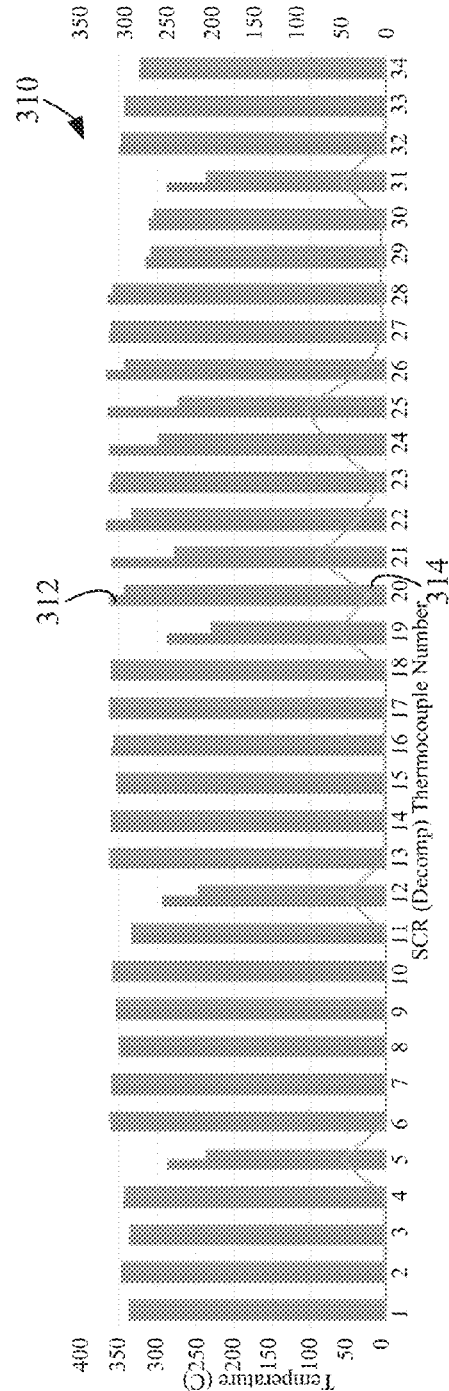

FIG. 3 depicts graphical distributions 300, 310 of temperature versus a wall position of a primary decomposition reaction tube and a secondary decomposition reaction tube during engine operation during no dosing and during dosing. The graphical distribution 300 for the primary decomposition reaction tube depicts a temperature measurements 302 during no dosing at a number of wall positions of a primary decomposition tube, which shows minimal temperature variation between locations when no dosing is occurring. However, the temperature measurements 304 during dosing at the number of wall positions of the primary decomposition tube shows greater temperature variations between locations when dosing is occurring as a result of impingement of dosed reductant, resulting in reductant deposit formation.

The graphical distribution 310 for the secondary decomposition reaction tube depicts a temperature measurements 312 during no dosing at a number of wall positions of a secondary decomposition tube, which shows minimal temperature variation between locations when no dosing is occurring. In addition, the temperature measurements 314 during dosing at the number of wall positions of the secondary decomposition tube shows minimal temperature variations between locations when dosing is occurring.

The greater temperature variations between the primary decomposition tube and the secondary decomposition tube are due to differing designs for each, which may result in differing reductant deposit formation for a doser of the primary decomposition reaction tube and a doser of the secondary decomposition reaction tube.

Figure 4:
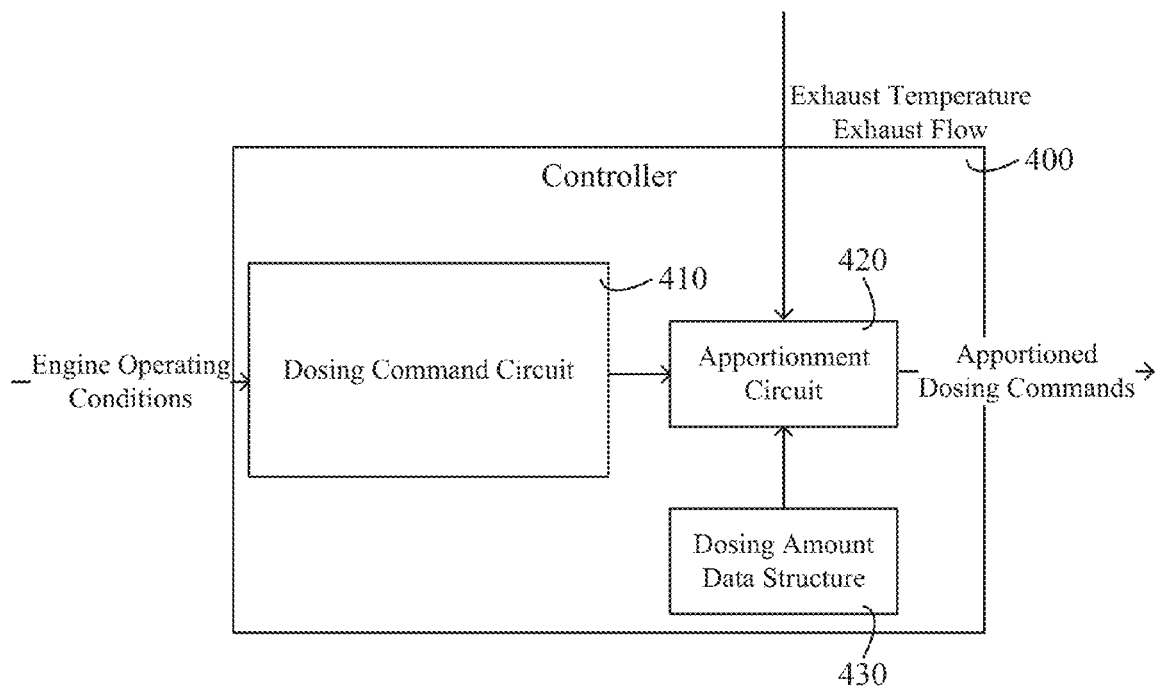
FIG. 4 is a block diagram of a controller for a selective catalytic reduction system that includes a dosing command circuit and an apportionment circuit.

FIG. 4 depicts an implementation of a controller 400 for a selective catalytic reduction system. The controller 400 is shown to include a dosing command circuit 410 and an apportionment circuit 420 communicably coupled to the dosing command circuit 410. The apportionment circuit 420 is also communicable coupled to a dosing amount data structure 430 to access maximum reductant dosing amounts for each doser, such as dosers 212, 222, for the selective catalytic reduction system. The dosing command circuit 410 is structured to determine a dosing amount for a selective catalytic reduction system based on engine operating conditions and the apportionment circuit 420 is structured to apportion the dosing amount to two or more apportioned dosing commands for two or more dosers of the selective catalytic reduction system.

In one embodiment, the dosing command circuit 410 may include or be communicably coupled with one or more sensors and/or other circuits of the controller 400 for receiving one or more values indicative of engine operating conditions. For instance, the dosing command circuit 410 may be coupled to an engine speed sensor for receiving a value indicative of the speed of the engine, a fuel flow rate sensor for receiving a value indicative of the fuel flow rate to the engine, an air flow rate sensor for receiving a value indicative of an air flow rate, an air temperature sensor for receiving a value indicative of an air temperature, etc. In some implementations, the dosing command circuit 410 may be communicatively coupled to one or more other circuits of the controller 400 to receive engine operating conditions, such as a feedforward circuit for determining one or more engine operating conditions. In another embodiment, the dosing command circuit 410 may include communication circuitry including, but not limited to, wired and wireless communication protocol to facilitate reception of the one or more values. In still another embodiment, the dosing command circuit 410 may include machine-readable media stored by the memory and executable by the processor, wherein the machine-readable media facilitates performance of certain operations to receive the values indicative of the engine operating conditions. For example, the machine-readable media may provide an instruction (e.g., command, etc.) to one or more sensors operatively coupled to the engine to monitor and acquire data. In this regard, the machine-readable media may include programmable logic that defines the frequency of acquisition of the data of the sensors. In yet another embodiment, the dosing command circuit 410 may include any combination of machine-readable content, communication circuitry, and one or more sensors.

Based on the foregoing, the dosing command circuit 410 may also be structured to determine a dosing amount based on the engine operating conditions. The dosing command circuit 410 may include and/or access one or more look-up tables to determine a dosing amount based on the engine operating conditions or may calculate a dosing amount based on the values of the engine operating conditions.

In one embodiment, the apportionment circuit 420 is communicably coupled with the dosing command circuit 410 to receive and/or access the dosing amount. In some implementations, the apportionment circuit 420 may also be coupled to an exhaust temperature sensor for receiving a value indicative of the temperature of the exhaust and/or an exhaust flow rate sensor for receiving a value indicative of the exhaust flow rate, etc. In another embodiment, the apportionment circuit 420 may include communication circuitry including, but not limited to, wired and wireless communication protocol to facilitate reception of the values of the exhaust temperature and/or exhaust flow rate. In still another embodiment, the dosing command circuit 410 may include machine-readable media stored by the memory and executable by the processor, wherein the machine-readable media facilitates performance of certain operations to receive the values indicative of the exhaust temperature and/or exhaust flow rate. For example, the machine-readable media may provide an instruction (e.g., command, etc.) to one or more sensors operatively coupled to the exhaust system to monitor and acquire data for the exhaust temperature and/or exhaust flow rate. In this regard, the machine-readable media may include programmable logic that defines the frequency of acquisition of the data of the exhaust temperature and/or exhaust flow rate. In yet another embodiment, the apportionment circuit 420 may include any combination of machine-readable content, communication circuitry, and the one or more sensors for the exhaust temperature and/or exhaust flow rate.

Based on the foregoing, the apportionment circuit 420 may also be structured to apportion the dosing amount to two or more apportioned dosing commands for two or more dosers of the selective catalytic reduction system. The apportionment circuit 420 may include and/or access one or more look-up tables of a dosing amount data structure 430 to determine a apportioned dosing amount for each of the two or more dosers based on the dosing amount, the exhaust temperature, and/or exhaust flow rate. The apportionment circuit 420 may apportion the commanded dosing amount for the dosers based on the maximum reductant dosing amounts for each doser, as will be described in greater detail in reference to FIG. 5. In other implementations, the apportionment circuit 420 may calculate a value for each apportioned dosing command based on the dosing amount, exhaust temperature, and/or exhaust flow rate.

The dosing amount data structure 430 includes a look-up table having a pre-determined maximum reductant dosing amount for each doser of the system. In some implementations, several maximum reductant dosing amounts for each doser may be included in the look-up table based on the exhaust temperature and/or exhaust flow (either measured from one or more sensors or estimated based on other data).

Figure 5:
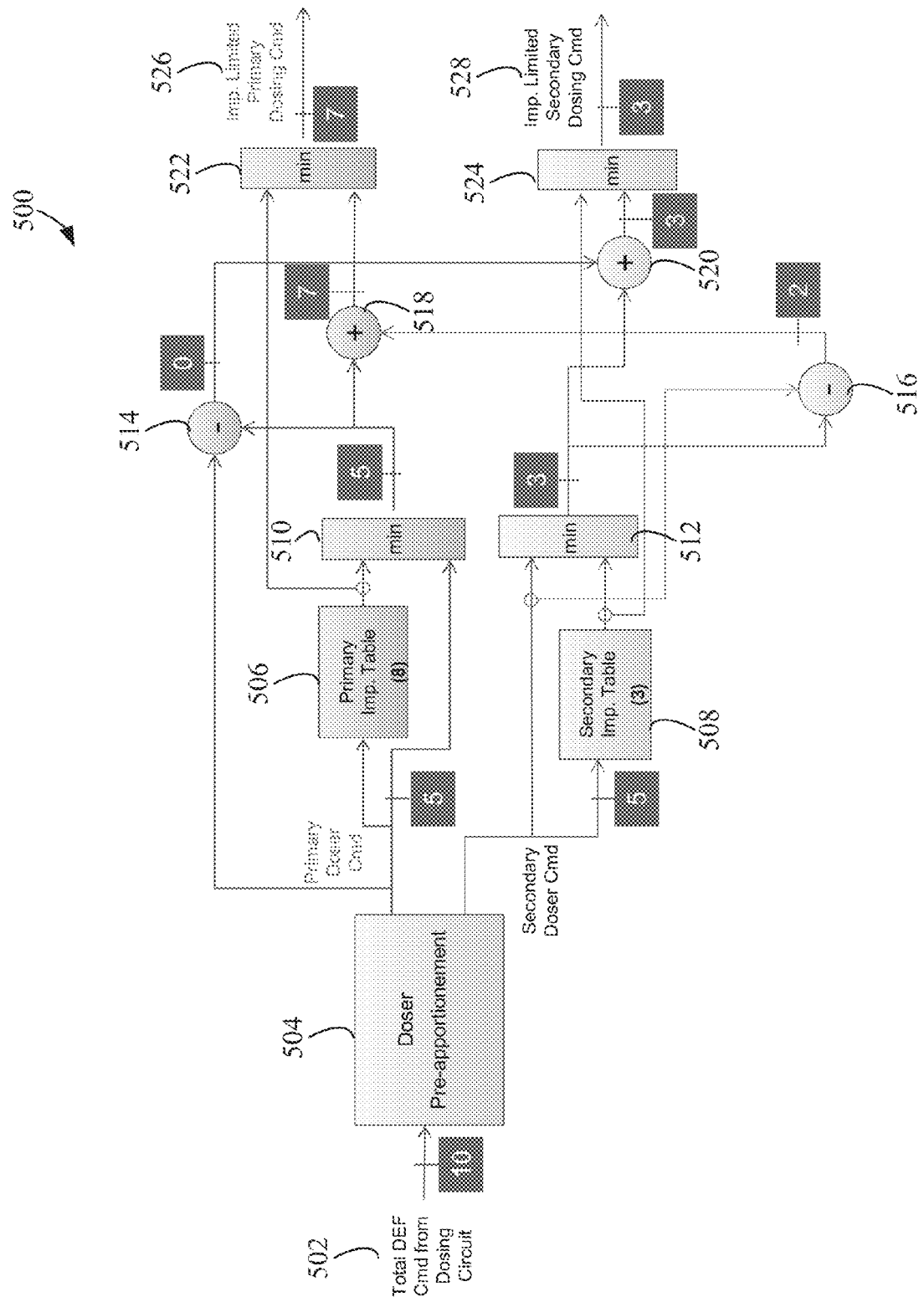
FIG. 5 is a control diagram for apportioning a commanded dosing amount to a first doser and second doser.

FIG. 5 depicts a control diagram for a process 500 for apportioning a dosing amount to a first apportioned dosing amount for a first doser and a second apportioned dosing amount for a second doser. The process 500 can be implemented by the apportionment circuit 420 of the controller 400 of FIG. 4. The process 500 includes receiving a total reductant command from the dosing command circuit 502. The total reductant command or dosing amount is based on the engine operating conditions and may be determined using one or more look-up tables or may be calculated based on the values of the engine operating conditions. In the process 500 shown, the total reductant command or dosing amount is 10 mL/s.

The process 500 includes a doser pre-apportionment 504 that initially divides the total reductant command or dosing amount based on a number of dosers for the system. In the process 500 shown, the doser pre-apportionment 504 divides the total reductant command or dosing amount in half based on the system including two dosers. As shown, a first or primary doser command is set to 5 mL/s and a second or secondary doser command is also set to 5 mL/s. In other implementations, the doser pre-apportionment 504 may divide the total reductant command or dosing amount into thirds if there are three dosers, quarters if there are four dosers, fifths if there are five dosers, etc. In still other implementations, the doser pre-apportionment 504 may divide the total reductant command or dosing amount unequally divided between the dosers.

The process 500 includes accessing a primary or first impingement table 506 to determine a first maximum doser amount for the first doser based on the exhaust temperature and/or exhaust flow rate. In the implementation shown, the primary or first impingement table 506 indicates that the first maximum doser amount is 8 mL/s for the first doser. The process 500 also includes accessing a secondary or second impingement table 508 to determine a second maximum doser amount for the second doser based on the exhaust temperature and/or exhaust flow rate. In the implementation shown, the secondary or second impingement table 508 indicates that the second maximum doser amount is 3 mL/s for the first doser. In further implementations, additional impingement tables for additional dosers may be accessed.

The process 500 includes determining a minimum between the first maximum doser amount and the first dosing amount 510. The minimum between the first maximum doser amount, 8 mL/s, and the first dosing amount, 5 mL/s, is the first dosing amount of 5 mL/s. The process 500 also includes determining a minimum between the second maximum doser amount and the second dosing amount 512. The minimum between the second maximum doser amount, 3 mL/s, and the second dosing amount, 5 mL/s, is the second maximum doser amount of 3 mL/s.

The process 500 further includes calculating a difference 514, 516 between the determined minimum 510, 512 and the original dosing amounts. The first calculated difference 514 between the first determined minimum 510 of 5 mL/s and the first dosing amount is 0, indicating that the full first dosing amount can be dosed from the first doser. The second calculated difference 516 between the second determined minimum 512 of 3 mL/s and the second dosing amount is 2 mL/s, indicating that an excess of 2 mL/s of the original second dosing amount cannot be dosed from the second doser without resulting in potential impingement and deposit formation.

The process 500 further includes calculating a cross-compensation amount 518, 520 based on the determined minimum 510, 512 and the calculated differences 514, 516 of one or more other dosing amounts. The first cross-compensation amount 518 between the first determined minimum 510 of 5 mL/s and the second calculated difference 516 for the second impingement limited dosing amount is 7 mL/s, combining the 2 mL/s excess from the second impingement limited amount with the first dosing amount of 5 mL/s. The second cross-compensation amount 520 between the second determined minimum 512 of 3 mL/s and the first calculated difference 514 for the first impingement limited dosing amount is 3 mL/s, combining the 0 mL/s excess from the first dosing amount with the second impingement limited amount of 3 mL/s.

The process 500 further includes determining a minimum 522, 524 based on the maximum doser amount 506, 508 and the cross-compensation amount 518, 520. The first minimum 522 between the first maximum doser amount 506 of 8 mL/s and the first cross-compensation amount 518 of 7 mL/s is the first cross-compensation amount 518 of 7 mL/s, which means the first doser can cross-compensate for the second doser excess of 2 mL/s without resulting in impingement to form reductant deposits. The second minimum 524 between the second maximum doser amount 508 of 3 mL/s and the second cross-compensation amount 520 is 3 mL/s, which corresponds to both the second maximum doser amount and the second cross-compensation amount.

The process 500 then outputs the impingement limited first apportioned dosing command or amount 526 to the first doser and the impingement limited second apportioned dosing command or amount 528 to the second doser to dose reductant for the system. If only impingement limits were used for the first and second apportioned dosing commands without cross-compensation, then the impingement limited first dosing command would be 5 mL/s and the impingement limited second dosing command would be 3 mL/s, resulting in 3 mL/s less reductant being dosed. Thus, the cross-compensation maximizes the dosed reductant by apportioning any excess reductant dosing amount to dosers with additional capacity prior to impingement.

The process 500 allows for independent reductant dosing impingement control for two or more dosers while maximizing the total reductant quantity injected or otherwise inserted across the entire aftertreatment system for the highest possible NO$_x$ conversion, thereby limiting impingement. The total reductant quantity dosed is maximized through cross-compensation that checks for available dosing capacity of other dosers in the aftertreatment system.

Figure 6:
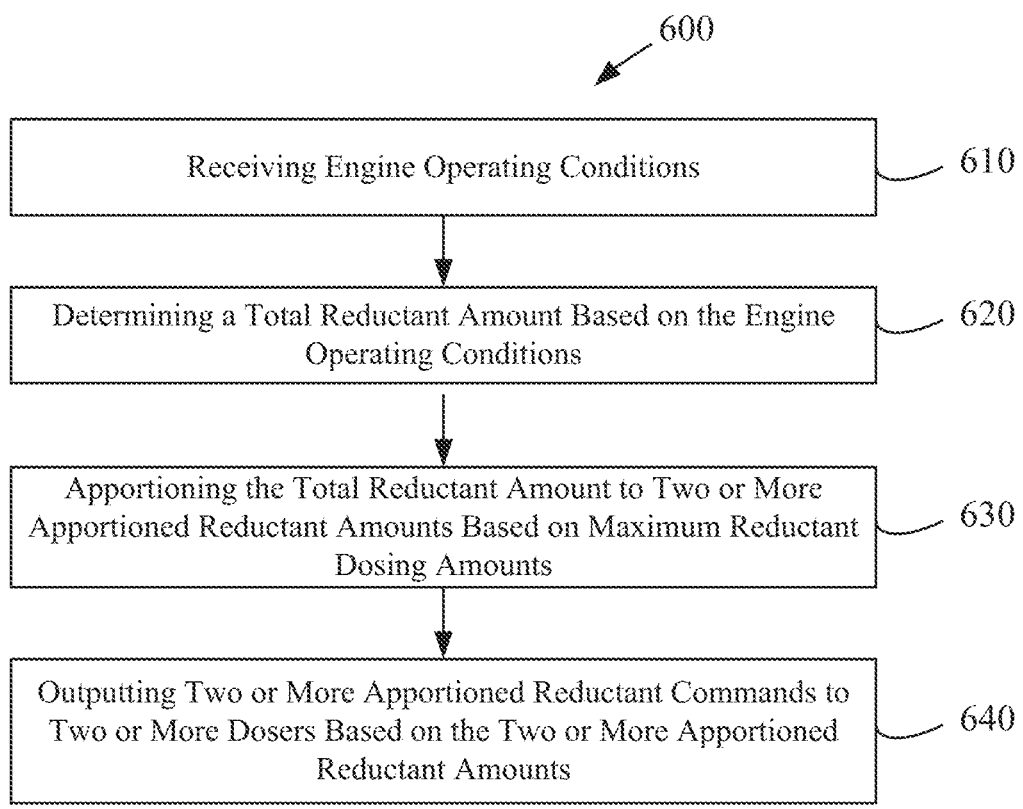
FIG. 6 is a process diagram for apportioning a commanded dosing amount to a first doser and second doser.

FIG. 6 depicts a process 600 for apportioning a commanded dosing amount to a first doser and a second doser. The process 600 includes receiving or accessing engine operating conditions (block 610). The engine operating conditions may be one or more parameters that are interpreted by the controller and/or a circuit of the controller. For instance, the engine operating conditions may include a flow rate, such as an air flow rate, an air temperature, an engine RPM, an air intake mass flow, an engine operating time and/or other parameters indicative of the engine operating conditions.

The process 600 includes determining a total reductant amount based on the engine operating conditions (block 620). The total reductant amount is based on the engine operating conditions and may be determined using one or more look-up tables or may be calculated based on the values of the engine operating conditions. In some implementations, the one or more look-up tables may include values for total reductant amounts that are indexed based on the engine operating condition values. That is, the look-up tables may be multi-dimensional tables that store values for total reductant dosing amounts that can be retrieved based on values for one or more engine operating condition parameters used as indexes to locate the total reductant dosing amount.

The process 600 includes apportioning the total reductant amount to two or more apportioned reductant amounts based on maximum reductant dosing amounts (block 630). The apportioning of the total reductant amount to two or more apportioned reductant amounts may be accomplished using the process 500 of FIG. 5. That is, the total reductant amount can be divided into initial reductant dosing amounts based on a number of dosers for the system (e.g., divided by two for two dosers, divided by three for three doses, etc.). In other implementations, the doser pre-apportionment may divide the total reductant command or dosing amount unequally divided between the dosers. A corresponding maximum reductant dosing amount for the corresponding doser is determined and the corresponding initial reductant dosing amount is compared to the corresponding maximum reductant dosing amount. If the initial reductant dosing amount is less than the corresponding maximum reductant dosing amount, then the initial reductant dosing amount is used as an intermediate reductant dosing amount. If the initial reductant dosing amount is greater than the corresponding maximum reductant dosing amount, then the corresponding maximum reductant dosing amount is set as the apportioned reductant amount for the corresponding doser and the excess dosing amount of the initial reductant dosing amount is determined for cross-compensation. The excess dosing amounts can be added to intermediate reductant dosing amounts that are below the corresponding maximum dosing amounts. The intermediate reductant dosing amounts can be modified based on the excess dosing amounts and the corresponding maximum dosing amounts to determine apportioned reductant amounts for each doser.

In some implementations, the determined excess dosing amounts are added to intermediate reductant dosing amounts in a tiered manner. That is, if a system includes three dosers, and a total dosing amount is determined as 12 mL/s, then the initial reductant dosing amount for each doser, if distributed equally, is determined to be 4 mL/s. If a third doser has a corresponding maximum reductant dosing amount of 2 mL/s, a second doser has a corresponding maximum dosing amount of 5 mL/s, and a first doser has a corresponding maximum dosing amount of 7 mL/s, then the apportioned dosing amount for the third doser is set to 2 mL/s based on the corresponding maximum reductant dosing amount, the 2 mL/s excess can then be added to the intermediate second dosing amount for the second doser of 4 mL/s. Since the 6 mL/s exceeds the corresponding maximum reductant dosing amount of 5 mL/s, the apportioned dosing command for the second doser is set to 5 mL/s and the 1 mL/s excess is then added to the intermediate first dosing amount for the first doser of 4 mL/s. Thus, the resulting apportioned dosing amounts would be 5 mL/s for the first doser, 5 mL/s for the second doser, and 2 mL/s for the third doser.

The process 600 further includes outputting two or more apportioned reductant commands to two or more dosers based on the two or more apportioned reductant amounts (block 64). The two or more apportioned reductant commands may be determined based on the two or more apportioned reductant amounts (e.g., the two or more apportioned reductant commands may be voltages output to a corresponding doser to control an amount of dosed reductant and the voltages may be calculated based on the two or more apportioned reductant amounts).

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    an aftertreatment system comprising:
        a primary decomposition reaction member defining a first chamber having a first volume,
        a first doser configured to dose reductant into the first chamber,
        a second decomposition reaction member defining a second chamber having a second volume that is smaller than the first volume, the second decomposition reaction member being formed as a separate member from the primary decomposition reaction member, and
        a second doser configured to dose reductant into the second chamber; and
    a controller configured to:
        receive engine operating conditions for an engine;
        determine a total reductant amount based on the engine operating conditions;
        apportion the total reductant amount into a first apportioned reductant amount based on a first maximum reductant dosing amount for the first doser and a second apportioned reductant amount based on a second maximum reductant dosing amount for the second doser; and
        output a first apportioned reductant dosing command to the first doser based on the first apportioned reductant amount and a second apportioned reductant dosing command to the second doser based on the second apportioned reductant amount.

2. The system of claim 1, wherein the first maximum reductant dosing amount and the second maximum reductant dosing amount are based on a temperature of an exhaust gas.

3. The system of claim 1, wherein the first maximum reductant dosing amount and the second maximum reductant dosing amount are based on an exhaust gas flow rate.

4. The system of claim 1, wherein apportioning the total reductant amount into a first apportioned reductant and the second apportioned reductant amount comprises:
    calculating an excess amount of reductant for the second doser based on the second maximum reductant dosing amount; and
    calculating a cross-compensation amount for the first doser based on the calculated excess amount.

5. The system of claim 4, wherein apportioning the total reductant amount into the first apportioned reductant and the second apportioned reductant amount comprises:
    dividing the total reductant amount into a first initial dosing amount for the first doser and a second initial dosing amount for the second doser;
    wherein the cross-compensation amount for the first doser is based on the calculated excess amount and the first initial dosing amount.

6. The system of claim 1, wherein the first maximum reductant dosing amount and the second maximum reductant dosing amount are based on a look-up table.

7. The system of claim 1, wherein the total reductant amount is based on a look-up table.

8. The system of claim 1 further comprising an engine, wherein the aftertreatment system is in fluid communication with the engine.

9. The system of claim 1, wherein the second decomposition reaction member is attached to the primary decomposition reaction member.

10. The system of claim 1, wherein the primary decomposition reaction member is upstream of the second decomposition reaction member.

11. A method for apportioning reductant dosing amounts for multiple-dosing architectures comprising:
    providing an aftertreatment system configured to be in fluid communication with an engine, the aftertreatment system comprising:
        a primary decomposition reaction member defining a first chamber having a first volume,
        a first doser configured to dose reductant into the first chamber,
        a second decomposition reaction member defining a second chamber having a second volume that is smaller than the first volume, the second decomposition reaction member being formed as a separate member from the primary decomposition reaction member, and a second doser configured to dose reductant into the second chamber;

receiving engine operating conditions for the engine;

determining a total reductant amount based on engine operating conditions;

apportioning the total reductant amount into a first apportioned reductant amount based on a first maximum reductant dosing amount for the first doser and a second apportioned reductant amount based on a second maximum reductant dosing amount for the second doser; and outputting a first apportioned reductant dosing command to the first doser based on the first apportioned reductant amount and a second apportioned reductant dosing command to the second doser based on the second apportioned reductant amount.

12. The method of claim 11, wherein the first maximum reductant dosing amount and the second maximum reductant dosing amount are based on a temperature of an exhaust gas.

13. The method of claim 11, wherein the first maximum reductant dosing amount and the second maximum reductant dosing amount are based on an exhaust gas flow rate.

14. The method of claim 11, wherein apportioning the total reductant amount into a first apportioned reductant and the second apportioned reductant amount comprises:

calculating an excess amount of reductant for the second doser based on the second maximum reductant dosing amount; and calculating a cross-compensation amount for the first doser based on the calculated excess amount.

15. The method of claim 14, wherein apportioning the total reductant amount into the first apportioned reductant and the second apportioned reductant amount comprises:

dividing the total reductant amount into a first initial dosing amount for the first doser and a second initial dosing amount for the second doser;

wherein the cross-compensation amount for the first doser is based on the calculated excess amount and the first initial dosing amount.

16. The method of claim 11, wherein the first maximum reductant dosing amount and the second maximum reductant dosing amount are based on a look-up table.

17. The method of claim 11, wherein the total reductant amount is based on a look-up table.

18. The method of claim 11, wherein the second decomposition reaction member is attached to the primary decomposition reaction member.

19. The method of claim 11, wherein, in the aftertreatment system, the primary decomposition reaction member is upstream of the second decomposition reaction member.

20. A controller for controlling an aftertreatment system configured to be in fluid communication with an engine, the aftertreatment system comprising: a primary decomposition reaction member defining a first chamber having a first volume, a first doser configured to dose reductant into the first chamber, a second decomposition reaction member defining a second chamber having a second volume that is smaller than the first volume, the second decomposition reaction member being formed as a separate member from the primary decomposition reaction member, and a second doser configured to dose reductant into the second chamber, the controller comprising:

a dosing command circuit configured to determine a total reductant amount based on engine operating conditions of the engine; and an apportionment circuit configured to:

apportion the total reductant amount into a first apportioned reductant amount based on a first maximum reductant dosing amount for the first doser and a second apportioned reductant amount based on a second maximum reductant dosing amount for the second doser, and output a first apportioned dosing command to the first doser based on the first apportioned reductant amount and a second apportioned reductant dosing command to the second doser based on the second apportioned reductant amount.

21. The controller of claim 20, wherein the first maximum reductant dosing amount and the second maximum reductant dosing amount are based on a temperature of an exhaust gas and an exhaust gas flow rate.

22. The controller of claim 20, wherein the controller further comprises a dosing amount data structure storing the first maximum reductant dosing amount and the second maximum reductant dosing amount.

23. The controller of claim 20, wherein apportioning the total reductant amount into a first apportioned reductant and the second apportioned reductant amount comprises:

calculating an excess amount of reductant for the second doser based on the second maximum reductant dosing amount; and calculating a cross-compensation amount for the first doser based on the calculated excess amount.

24. The controller of claim 23, wherein apportioning the total reductant amount into the first apportioned reductant and the second apportioned reductant amount comprises:

dividing the total reductant amount into a first initial dosing amount for the first doser and a second initial dosing amount for the second doser;

wherein the cross-compensation amount for the first doser is based on the calculated excess amount and the first initial dosing amount.

25. The controller of claim 20, wherein the total reductant amount is based on a look-up table.

26. The controller of claim 20, wherein the controller is for controlling an aftertreatment system in which the primary decomposition reaction member is upstream of the second decomposition reaction member.

* * * * *